United States Patent

Muzzarelli, Nee Weckx

[15] 3,635,818

[45] Jan. 18, 1972

[54] CHITIN AND CHITOSAN AS CHROMATOGRAPHIC SUPPORTS AND ADSORBENTS FOR COLLECTION OF METAL IONS FROM ORGANIC AND AQUEOUS SOLUTIONS AND SEA WATER

[72] Inventor: Maria Gertrude Muzzarelli, Nee Weckx, Casella Postale 693, Bologna 40100, Italy

[22] Filed: Oct. 13, 1969

[21] Appl. No.: 865,999

[30] Foreign Application Priority Data

Dec. 6, 1968 Italy......................................1836/68

[52] U.S. Cl. .........................................................210/31 C

[51] Int. Cl.......................................................B01d 15/08
[58] Field of Search.........................210/31 C, 198 C, 52, 54

[56] References Cited

UNITED STATES PATENTS 3,533,940  10/1970  Peniston et al. ........................210/52

*Primary Examiner*—Reuben Friedman
*Assistant Examiner*—Charles N. Hart
*Attorney*—Guido Modiano and Albert Josif

[57] ABSTRACT

The present invention relates to the use of chitin as a chromatographic chelating support and adsorbent for the collection and for the separation of the metal ions from aqueous and organic solutions and from sea water.

10 Claims, No Drawings

CHITIN AND CHITOSAN AS CHROMATOGRAPHIC SUPPORTS AND ADSORBENTS FOR COLLECTION OF METAL IONS FROM ORGANIC AND AQUEOUS SOLUTIONS AND SEA WATER

BACKGROUND OF THE INVENTION

The present invention relates to the use of chitin as a chromatographic chelating support.

It is known the use of aminoethylcellulose, diethylaminocellulose and para-aminobenzylcellulose as complexing agents toward transition metals. However, these substituted polyanhydroglucosides are generally unsuitable for the collection of metals from aqueous solutions.

One object of the present invention is to provide a new method for adsorbing metal ions from an aqueous and organic solutions with high yields.

Another object of the present invention is that such method is simple to carry out and does not require specific equipment for the carrying out thereof.

SUMMARY OF THE INVENTION

This and further objects which will better appear hereinbelow are attained by a method according to the invention which provides the use of chitin to collect ions from aqueous and organic solutions, deliberately taking advantage of the fact that chitin contains at least 7 percent of nitrogen.

According to the invention it has been found that certain completely substituted polysaccharides carrying one amine or amide group on each glucose ring have a much higher capacity of adsorbing metal ions than the substituted celluloses and are at the same time suitable for collecting ions from aqueous and organic solutions. The substituted polyanhydroglucosides presently used as complexing agents towards transition metals contain comparatively a small number of aminic groups, as it is well known. Furthermore recent researches have shown that it is today impossible to introduce more than 1.5 percent nitrogen into the cellulosic chain. It is retained that such unsatisfactory capacity of adsorbing metal ions of the cellulose compounds is due to the limited content of nitrogen.

Chitin is on the other hand a naturally occurring polymer containing 9 percent nitrogen and designates polymers whose chains are constituted by both glucosamine and N-acetylglucosamine. Poly-N-acetylglucosamine is called chitan and is β-(1→4)2-acetamido-2-deoxy-D-glucan. Chitosan is completely deacetylated chitan or chitin.

Among these natural polymers chitin is the most abundant in vegetables and animals. Its degradation leads to N-acetylglucosamine and to chitobiose. Elementary analysis of chitins from various sources gives constant values indicating that there is one nitrogen atom on each ring.

It is believed that commercially available chitin contains quantities of chitan, glucosamine, chitobiose octaacetate, variously acetylated chitins, chitobiose, chitosan, and other polyglucosamines derived from chitin. As used herein it is intended that these derived polyglucosamines be included in the term chitin.

Chitin has been studied by chemical and enzymatic hydrolysis, deuterium exchange, infrared spectrometry, differential thermal analysis, nuclear magnetic resonance, X-ray diffraction and electron microscopy, but it has not been considered as a material for collecting metal ions.

According to the invention, it has been found that chitin and chitosan look like chelating chromatographic supports. They are unaffected by temperature variations. Chitin does not putrefy and it is not attacked by bacteria and it is difficulty hydrolized. Chitosan is slightly soluble in mineral acids at pH below 5.8, but organic acids are necessary to bring it into solution.

The invention is illustrated in the following examples given by way of illustration only and to be considered as nonlimiting the scope of the invention.

EXAMPLE I

One cubic meter of sea water containing 3 mg. of mercury ions was passed under gravity through a 20 cm. high, 2 cm. diameter column packed with 100–200 mesh powder of technical grade chitin, with a flow rate of one drop per second. Mercury was retained in the upper part of the column which was subsequently washed with distilled water. 2.04 mg. of mercury were recovered by elution with ammonium thiocyanate (20 ml. of 1 F. solution); then the column was washed again with distilled water and utilized to purify a further amount of water.

EXAMPLE II

Fifty ml. of brine containing amounts in the order of nanograms of different elements were shaken for about 1 hour with 200 mg. of chitosan at a temperature of 20° C. The data obtained from such collection are indicated in the following table I.

TABLE I

| Trace element | Adsorbed % |
| --- | --- |
| Au | 72 |
| Co | 80 |
| Hg | 60 |
| Zn | 100 |
| Tb | 92 |
| Ag | 100 |
| Sb | 100 |
| In | 90 |

EXAMPLE III

One 100–of water containing the following metal ions: gold, mercury, iron, silver, antimony, cobalt, chromium, zinc, iridium, indium, palladium and molybdate ions, was mechanically shaken with half a gram of 100–200 mesh chitin powder. After one hour all the metal ions present in the solution were collected. The chitin powder was filtered on a fritted disc and washed with complexing agents such as ethylenediaminetetraacetic acid and ammonium thiocyanate to separate the above-mentioned ions.

The result of texts carried out according to the example III are reported in the following table II which illustrates the adsorption of metal ions on 200 mg. of chitin, 100–200 mesh, from 50 ml. water containing 22.1 microgram atom of metal at 20° C.

TABLE II

| | Time (hours) | Adsorbed quantity (in % of the available amount) | | |
| --- | --- | --- | --- | --- |
| | | pH=2.5 distilled | pH=6 water | pH=7.6 sea water |
| $Hg^{2+}$ | 1 | — | 42 | — |
| | 2 | 7 | 51 | — |
| | 4 | 7 | 62 | 7 |
| | 7 | — | — | 7 |
| | 24 | — | 55 | 10 |
| $Co^{2+}$ | 2 | N.D. | N.D. | N.D. |
| | 6 | N.D. | N.D. | 5 |
| | 24 | N.D. | N.D. | 8 |
| $Au^{3+}$ | 1 | — | 100 | 80 |
| | 2 | 71 | 100 | 85 |
| | 5 | 66 | 100 | 90 |

| Ion | | | | |
|---|---|---|---|---|
| Sb³⁺ | 1 | *40 | — | *42 |
|  | 16 | 30 | — | 42 |
|  | 18 | 44 | — | 42 |
|  | 24 | 30 | — | 42 |
| Ag⁺ | 1 | — | **38 | — |
|  | 2 | — | **56 | — |
|  | 3 | — | **62 | — |
|  | 4 | — | 70 | — |
|  | 8 | — | 70 | — |
| Cr³⁺ | 1 | 10 | 25 | 35 |
|  | 2 | 15 | 20 | 46 |
|  | 17 | — | 30 | — |
|  | 24 | — | 25 | 55 |
| In³⁺ | 1 | 78 | — | — |
|  | 2 | 70 | — | — |
| Fe²⁺ | 1 | 40 | — | 100 |
|  | 2 | 40 | — | 100 |
|  | 16 | 55 | — | — |
|  | 24 | 50 | — | — |
| Zn²⁺ | 1 | 0 | 45 | 30 |
|  | 2 | 0 | 35 | 29 |
|  | 5 | — | 22 | 38 |
|  | 8 | — | 20 | 36 |
| Ir³⁺ | 1 | *30 | — | *18 |
|  | 5 | 30 | — | 30 |
|  | 8 | 32 | — | 43 |
|  | 24 | 36 | — | 46 |
| Pd²⁺ | 1 | 30 | 80 | 40 |
|  | 2 | 60 | 100 | 50 |
| Cu²⁺ | 1 | 80 | 100 | 80 |
| MoO₄ | 1 | 20 | 5 | 5 |
|  | 2 | 25 | 6 | 8 |

*pH=1.5

**pH adjusted with nitric acid.

N.D. = not detectable, below detection limits.

It should be noted that the adsorption, generally speaking, depends on time of contact, temperature, pH, concentration of the ion under examination and concentration of the other ions present.

In table I the adsorption data are listed for chitin from a reference concentration of 442 microgram atom per liter. Chitin is particularly effective in collecting gold, iron, antimony, iridium, copper, palladium, molybdate and chromate from distilled water solutions. No large differences exist for potable water solutions. Generally at pH=6 values are higher than at pH=2.5 but for cobalt and cesium they are not appreciable. For molybdenum, values are higher at low pH; at pH=1, one gram of chitin adsorbs more than one milligram atom.

EXAMPLE IV

A test of adsorption of the chromate ion has been carried out. 60 ml. of an aqueous solution containing 22.1 micrograms of chromate were shaken together with 200 mg. of chitin. Colorimetric determinations of the adsorbed quantities were effected in different conditions as reported in the table III hereinbelow.

EXAMPLE V

The procedure of example IV has been repeated except that chitosan was used instead of chitin.

The results are reported on the following table III which illustrates colorimetric determinations of chromate after shaking 50 ml. solution with 200 mg. chitin and chitosan.

TABLE III

| pH | Transmission % | Adsorption mg./200 mg. | Adsorption % |
|---|---|---|---|
| Chitin: | | | |
| — | 12 | 1.00 | blank |
| 3 | 55 | 0.75 | 75 |
| 4 | 81 | 0.90 | 90 |
| 5 | 35 | 0.50 | 50 |
| — | 37 | 0.50 | blank |
| 3 | 60 | 0.25 | 50 |
| 4 | 56 | 0.20 | 40 |
| 5 | 55 | 0.20 | 40 |
| — | 60 | 0.25 | blank |
| 3 | 92 | 0.20 | 80 |
| 4 | 81 | 0.15 | 60 |
| 5 | 70 | 0.05 | 25 |
| Chitosan: | | | |
| — | 60 | 0.25 | blank |
| 5 | 96 | | 840.21 |
| 5 | 92 | 0.20 | 80 |
| 5 | 92 | 0.20 | 80 |

Data for chromate are given in table III. It can be seen that an adsorption capacity maximum is at a pH between 3 and 4. Chitosan is here more effective than chitin. These results indicate that chromate ion is preferentially adsorbed on chitin with respect to chromium (III) ion. This is in agreement with the data in table I where sea water values for chromium are the only ones higher than the corresponding values in distilled water. It has been established, in fact, that in sea water chromium exists as chromate ion.

In neutral sea water, values are in any case very high for all the ions studied, with the exception of mercury, cobalt, cesium and molybdenum. Antimony measurements were done at pH=1.5 to avoid precipitation of oxychloride; it is not excluded that gold and iron are partially in colloidal state.

EXAMPLE VI

At a lower concentration level, close to the natural concentrations in sea water, the ions examined were equally adsorbed, particularly well gold, antimony and zinc. The values are reported in table IV which illustrates the adsorption of metal ions on 200 mg. of 100–200 mesh chitin powder from 50 ml. water containing trace metals at 20° C. and pH=7.

TABLE IV

| | | Adsorbed quantity (in % of the available amount) | |
|---|---|---|---|
| Ion | Time (hours) | distilled water (pH=7) | sea water (pH=7.6) |
| Hg²⁺ | 1 | 46 | 32 |
|  | 2 | 40 | 32 |
|  | 6 | — | 36 |
|  | 24 | — | 60 |
| Co²⁺ | 1 | 75 | 41 |
|  | 2 | 70 | 48 |
|  | 4 | 78 | 50 |
|  | 24 | 80 | 50 |
| Au³⁺ | 1 | 79 | 29 |
|  | 3 | 79 | 44 |
|  | 6 | 82 | 40 |
|  | 8 | 86 | 36 |
| Tb³⁺ | 1 | 91 | 97 |
|  | 2 | 95 | 96 |

| | | | |
|---|---|---|---|
| $In^{3+}$ | 1 | 53 | 68 |
| | 2 | 75 | 60 |
| $Sb^{3+}$ | 1 | *46 | *40 |
| | 5 | *46 | *46 |
| | 7 | *54 | *52 |
| | 24 | *52 | *42 |
| $Ag^+$ | 1 | 41 | 18 |
| | 5 | 73 | 39 |
| | 8 | 60 | 65 |
| | 24 | 74 | 52 |
| $Ir^{3+}$ | 1 | 13 | 7 |
| | 15 | 23 | 14 |
| | 18 | 25 | 14 |
| | 24 | 28 | 13 |
| $Cs^+$ | 1 | 57 | 3 |
| | 2 | 65 | 5 |
| | 8 | 65 | 4 |
| | 24 | 62 | 5 |
| $Zn^{2+}$ | 1 | 100 | 70 |
| | 2 | 100 | 80 |
| | 5 | 100 | 80 |

*pH=2.2

200 ml. of potable water containing 5 mg. of uranyl nitrate added thereto, were shaken for half an hour with chitosan. After filtration the chitosan was washed with 3 ml. of a 20 percent solution of sodium carbonate which deadsorbed the uranium. The recovery yield was 90 percent.

Uranium can also be collected from sea water as radiochemical works illustrated in tables V and VI demonstrate.

TABLE V

Collection of 233 U from 50 ml. sea water containing $4.2 \times 10^{-6}$ g. U on 200 mg. chitosan—pH=5.5.

| Reference solution cps./g. | Treated solution cps./g. | Time (hours) | adsorbed % |
|---|---|---|---|
| 27.2±3.0 | 1.7±0.5 | 1 | 94.3 |
| 31.7±1.3 | 1.2±0.5 | 2 | 96.3 |
| 30.2±0.8 | 0.9±0.5 | 18 | 97.3 |

TABLE VI

Elution profile of $5 \times 10^{-6}$ g. 233 U adsorbed from sea water on chitosan column 7×0.5 cm.

| Eluting solution | fraction volume, ml. | eluate cps./g. |
|---|---|---|
| dist. water | 30 | 0±0.5 |
| $Na_2CO_3$ 1 F | 10 | 0±0.5 |
| idem | 10 | 161.2±4.3 |
| idem | 10 | 11.3±2.8 |
| | Total | 172.5±7.1 |
| | Expected | 178.2±5.0 |
| | Yield | about 100% |

Other ions were investigated by emission spectrography. Spectrographic analysis was first carried out on chitin as supplied and then on chitin stirred for 12 hours in filtered sea water (400 mg. in 4 liters). Chitin was found to contain 0,001 percent silicon, phosphorous, magnesium and traces of manganese, aluminum, copper and chromium. After treatment with sea water the elements detected were: chromium, aluminum, copper, boron, silicon, magnesium, manganese, molybdenum, vanadium, silver, zinc, titanium, nickel, iron. No cobalt was found, according to tabulated data, sodium was remarkably low, chromium, aluminum and copper higher than the other ones according to their concentrations in sea water. Gold was not detected as it is present at low concentration.

These data are of value because, among other facts, they point out that adsorption equilibria take place even at these very low concentrations, in the presence of relatively enormous amounts of sodium, potassium and magnesium salts present in sea water.

Adsorption capacity and adsorption rates on chitosan are much higher than for chitin, as can be seen in the following table VII, because of the more available electrons on the nitrogen atom. As a point of difference, chitosan can collect cobalt. Adsorption of chitosan is often accompanied by color appearance, for instance deep blue with copper and green with iridium.

Table VII illustrates adsorption values of metal ions on 200 mg. of chitosan, 100–200 mesh from 50 ml. water at 20° C. and pH=7.6 after 1 hour shaking.

TABLE VII

| | With carrier added | | Without carrier | |
|---|---|---|---|---|
| | dist. | sea | dist. | sea |
| $Hg^{2+}$ | 90 | 92 | 100 | 100 |
| $Co^{2+}$ | 40 | 65 | 100 | 100 |
| $Au^{3+}$ | 100 | 100 | 55 | 63 |
| $Sb^{3+}$ | — | — | 32 | 37 |
| $Ag^+$ | 100 | — | 90 | — |
| $Zn^{2+}$ | 70 | 100 | 50 | 100 |
| $Ir^{3+}$ | 15 | 14 | 44 | 11 |
| $Cu^{2+}$ | 100 | 100 | 100 | 100 |
| $Pd^{2+}$ | 100 | 100 | 100 | 100 |
| $MoO_4^-$ | 25 | 9 | 20 | 8 |
| $UO_2^{2+}$ | 100 | 100 | 100 | 100 |
| $Tb^{3+}$ | — | — | 95 | 97 |
| $In^{3+}$ | 60 | 90 3(2.7) | 93 | 90 |

Values are average of five measurements

EXAMPLE VII

In 600 ml. of distilled water, 180 mg. of tetrachloroauric acid were dissolved, pH adjusted to 1 and the solution was passed through a column of chitin. No gold leakage was detected even after washing with 100 ml. water. A separation of gold from iridium was effected on a chitosan column by eluting iridium with 0.01 N hydrochloric acid. Gold was recovered by ashing or by elution with 0.1 N potassium cyanide.

EXAMPLE VIII

Three liters of sea water with added 6.5 micrograms of radioactive mercury were forced to pass through a chitin column at a flow rate of 500 ml./h. Mercury was retained with a yield of 68 percent. Complete elution was performed with 1 F. ammonium thiocyanate.

EXAMPLE IX

Under the same conditions, 1 microgram of radioactive iron was collected with a 100 percent yield from 6 liters of sea water. Only 30 percent of 0.010 micrograms of radioactive cobalt was recovered under the same conditions.

EXAMPLE X

Five milligrams of chromate ion in 5 liters of potable water were collected on a chitin column and then recovered by washing with 100 ml. of 0.1 F disodium phosphate or sodium sulfite. This means that more than four liters of pure water were recovered.

EXAMPLE XI

Chitosan columns are very effective in collecting iron and copper ions. Experiments were done with one liter solutions (at the two concentrations indicated above, at a flowrate of 10 l./h. In both cases, complete adsorption was achieved in the upper part of the column. Copper was then eluted by passing 5 ml. of 0.1 F. EDTA and so quantitatively separated from iron.

Chitin and chitosan are hereby proposed as chromatographic supports and as adsorbents for collection of metal ions from organic and aqueous solutions and from industrial and sea waters. They favorably compare with chelating resins used hereintofore. Chitin resists also better to hydrolysis and can be used in a wider pH range. The cost of chitin is positively competitive with the cost of chelating resins or ion-exchange resins in general. Chitosan is not readily available on the market, but of course it could become competitive, should the request justify its production. Capacity is at least as high as resin capacity and perhaps a different stirring action, i.e., ultrasonic, would increase it. Chitin columns can be easily regenerated.

It is believed that the adsorption measurements done will be mostly of interest for the recovery of trace metals; for instance, in the field of recovery of trace metals from waste, sea and source waters existing methods need to be improved, particularly for uranium and, on the basis of laboratory results, apparently chitosan meets the task.

Chitin and chitosan should also find a wide range of applications in the final step treatment of waste waters, following coprecipitation of other purification processes.

Chitin and chitosan are particularly suitable for collecting copper, iron, zinc, chromate, sulfite and other ions. A rapid preconcentration and determination of less than 1 p.p.m. of copper is for instance required to survey the corrosion of pipelines and boilers. Chitosan meets the requirements.

As far as separations are concerned, the ability of chitin and chitosan to recover trace metal ions even when large amounts of IA and IIA group ions are present should be emphasized. The large amounts of sodium, potassium and magnesium salt present in sea water are not detrimental to the adsorption of transition metals on these polymers. It is evident that chromatography performed on these polymers in order to effect multitrace element separation from large amounts of a radioactive matrix element is simpler than the techniques proposed in the prior art. In fact there is no need to prepare a pretreated bed column, and larger weights of sample can be handled. On chitin a large amount of matrix (sodium salt, for instance) passes through, traces are retained, which is experimentally easier and conceptually more correct. Trace separations from sodium chloride by chromatography on chitin in biological samples after neutron activation analysis are simply achieved.

Crustacean chitin is presumably responsible for the adsorption of metal ions on organic residues which fall to the bottom of the sea. The method of the present invention is thus effective in the purification of sea water from radioactive ions artificially introduced; in the recovery of such ions for analytical and economical interests; in the recovery of ions or solvents from industrial wastes; in the purification of organic solvents; in the reduction of a water pollution and the collection of ions from waters of a whatever origin, namely sea, river, lake, underground and the rain waters.

The invention thus conceived is susceptible of numerous variations and changes readily apparent to a skilled person in the art. Thus for example the amount of chitin or derivatives thereof contained in a filter unit or in a pipe will be determined according to the requirements. The chitin or derivatives thereof could be in the form of flakes, powder, gel, membrane or in any suitable form to define a proper adsorption bed. The solutions to be treated may pass through the chitin bed by gravity, hydrostatic pressure, capillarity or soaking. After the treatment of the organic or aqueous solutions and of waters the chitin is washed with a suitable solution to elute the collected ions which are used for analytical determination or recovered. Afterwards, chitin can be discharged or reused in a filter unit or column or dispersed again to treat a further amount of solution or water.

I claim:

1. A method for collecting ions of transition metals from aqueous solutions thereof, said method comprising the steps of:
   i. contacting an aqueous solution including transition metal ions with a mass of chitin containing at least 7 percent by weight of nitrogen thereby to adsorb the transition metal ions by the said chitin mass; and
   ii. deadsorbing said transition metal ions from the said chitin mass.

2. A method as claimed in claim 1, wherein the said contacting step involves stirring and shaking the said chitin mass with said aqueous solution of transition metal ions.

3. A method as claimed in claim 1, wherein the said contacting step consists in passing the said aqueous solution through a bed of chitin containing at least 7 percent by weight of nitrogen.

4. A method as claimed in claim 3, wherein the said bed of chitin is a filter unit.

5. A method as claimed in claim 3, wherein the said bed of chitin is a chromatographic column.

6. A method as claimed in claim 1, wherein the said adsorbing step consists in a complexing chelating reaction of the transition metal ions and the nitrogen in the said chitin mass.

7. A method as claimed in claim 1, wherein the said chitin is in a powder form.

8. A method as claimed in claim 1, wherein said chitin includes glucosamine, chitobiose, octa-acetate, variously acetylated chitins, chitobiose, chitosan, chitan and polyglucosamines derived therefrom.

9. A method as claimed in claim 1, wherein the said chitin is chitosan.

10. A method as claimed in claim 1, wherein the aqueous solution is sea water.

* * * * *